United States Patent [19]

Altendorf et al.

[11] 4,403,534

[45] Sep. 13, 1983

[54] MOVABLE PROTECTIVE HOOD FOR POWER TOOL OF A WORK TOOL MACHINE

[75] Inventors: Kurt Altendorf; Siegfried Thiele, both of Minden, Fed. Rep. of Germany

[73] Assignee: Wilhelm Altendorf GmbH & Co. KG, Minden, Fed. Rep. of Germany

[21] Appl. No.: 301,204

[22] Filed: Sep. 11, 1981

[30] Foreign Application Priority Data

Sep. 13, 1980 [DE] Fed. Rep. of Germany ........ 3034665

[51] Int. Cl.³ .............................................. B27G 3/00
[52] U.S. Cl. .................................... 83/100; 83/440.2; 144/252 R; 51/273
[58] Field of Search .............................. 83/100, 440.2; 144/252 R; 51/273

[56] References Cited

U.S. PATENT DOCUMENTS

| | | | |
|---|---|---|---|
| 1,712,828 | 5/1929 | Klehm | 83/440.2 |
| 2,593,596 | 4/1952 | Olson | 83/440.2 X |
| 3,832,922 | 9/1974 | Stout | 83/100 X |
| 4,253,362 | 3/1981 | Olson | 83/100 |
| 4,255,995 | 3/1981 | Connor | 83/100 X |

*Primary Examiner*—Donald R. Schran
*Attorney, Agent, or Firm*—Christie, Parker & Hale

[57] ABSTRACT

A work tool machine comprises a power tool, an exhaust hood assembly disposed over the power tool in a manner to permit access of a work piece thereto, and a stationary member spaced from the hood assembly. An elongated guide bar extending between the stationary member and the hood assembly is pivotally attached at one end to the stationary member for rotation about a first axis, and at the other end to the hood assembly for rotation about a second axis. An elongated conduit extending between the stationary member and the hood assembly in fluid communication with the hood assembly is pivotally attached at one end to the stationary member for rotation about a third axis, and at the other end to the hood for rotation about a fourth axis. The distance between the first and second axes is equal to the distance between the third and fourth axes, and the distance between the first and third axes is equal to the distance between the second and fourth axes. The conduit is connected to an exhaust fan.

12 Claims, 3 Drawing Figures

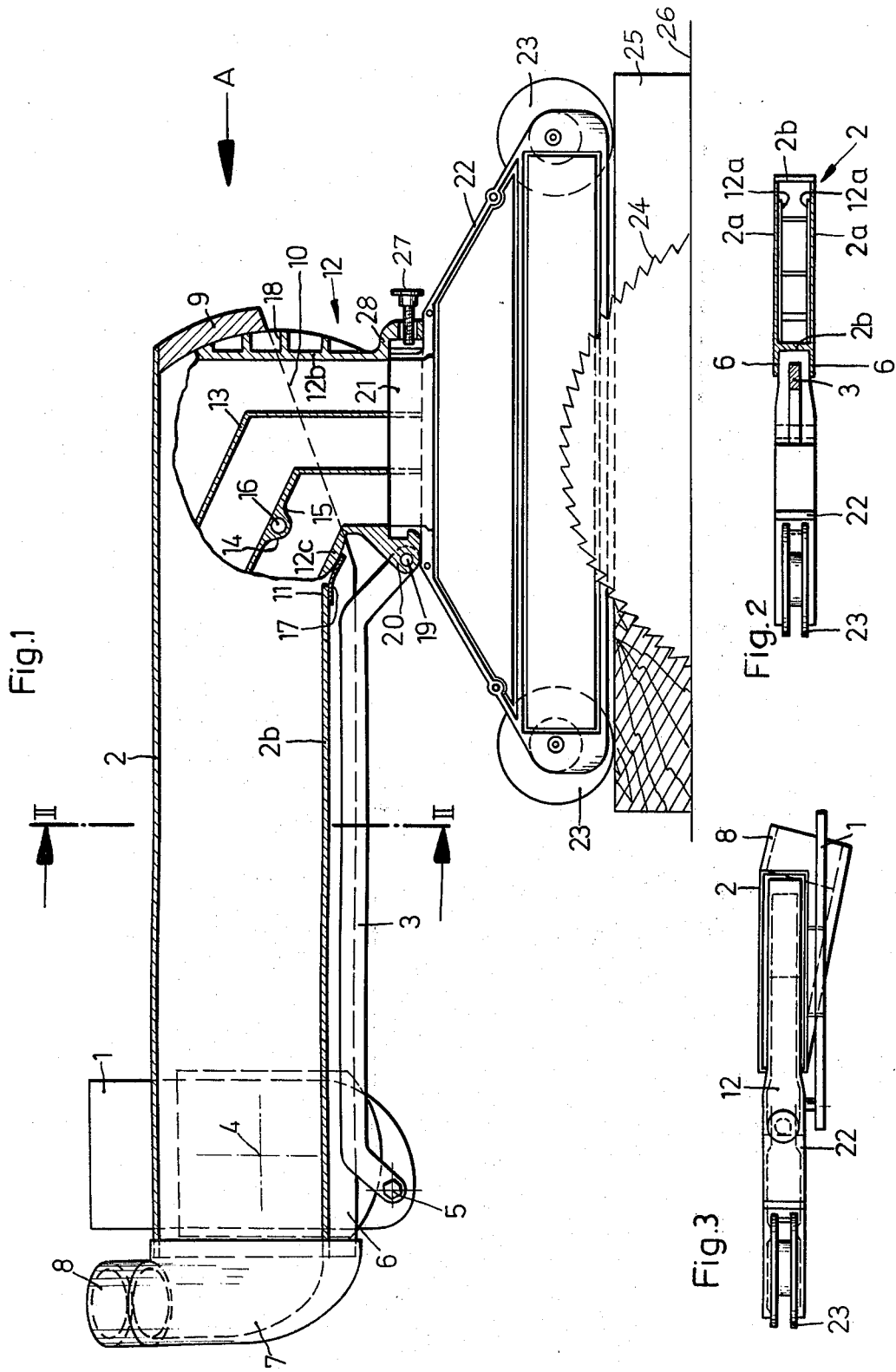

MOVABLE PROTECTIVE HOOD FOR POWER TOOL OF A WORK TOOL MACHINE

BACKGROUND OF THE INVENTION

The invention relates to a movable protective hood for the power tool of a work tool machine, specifically for the saw blade of a circular table saw and, more particularly, to such a hood provided with a four-axis, parallel-linkage, vertical guide and a connecting tube for vacuum removal of shavings.

The parallelogram guide for the exhaust hood permits that its positioning for various thicknesses of the piece of material to be worked can be accommodated by plane parallel height adjustment, i.e., vertical adjustment, of the plane of the exhaust cover. Moreover, the design in general provides that even when tension or weight is applied to it, the exhaust cover remains stationary above the work table surface at any level.

In the usual constructions of this type, the connecting tube for the vacuum hose is directly attached to the exhaust cover. Thus, not only is the view of the work piece beneath the exhaust hood cover obstructed, but also the through motion of the work piece along the parallel stroke and its removal from the table are hindered. Further, the rest of the hose often interferes with other components of the machine.

SUMMARY OF THE INVENTION

According to the invention, a work tool machine comprises a power tool, an exhaust hood assembly disposed over the power tool in a manner to permit access of a workpiece thereto, and a stationary member spaced from the hood assembly. An elongated guide bar extending between the stationary member and the hood assembly is pivotally attached at one end to the stationary member for rotation about a first axis, and at the other end to the hood assembly for rotation about a second axis. An elongated conduit extending between the stationary member and the hood assembly in fluid communication with the hood assembly is pivotally attached at one end to the stationary member for rotation about a third axis, and at the other end to the hood for rotation about a fourth axis. The distance between the first and second axes is equal to the distance between the third and fourth axes, and the distance between the first and third axes is equal to the distance between the second and fourth axes. The conduit is connected to an exhaust fan or other means for exhausting the hood.

By means of the described four-axis, parallel-linkage guide incorporating the conduit as one of the linkages, the bottom edge of the hood assembly remains parallel to the work surface during height adjustment while shavings resulting from operation of the power tool are removed from the hood through such linkage.

BRIEF DESCRIPTION OF THE DRAWINGS

The features of a specific embodiment of the best mode contemplated of carrying out the invention are illustrated in the drawings, in which:

FIG. 1 is a side-sectional view of a work machine incorporating principals of the invention;

FIG. 2 is a sectional end view of the work machine taken through plane II—II in FIG. 1; and FIG. 3 is an end elevation view of the work machine looking in the direction of arrow A in FIG. 1.

DETAILED DESCRIPTION

Fundamental to this invention is the problem of how to improve the removal of shavings in a parallelogram-guided protective cover of the aforementioned type with an arrangement that does not interfere with the use and handling of the protective cover while in operation.

This invention provides for a solution to the problem in that one link of a four-axis, parallel-linkage vertical guide comprises a duct with its one end connected to the interior of the exhaust cover, while the conventional connecting tube is positioned at its other end. As a result of the integration of the exhaust mechanism into the construction of the exhaust cover guide, no additional space in the area of the exhaust cover is necessary for the passage of exhaust air. Beyond that, the uncontrollable effect of stress on the exhaust cover, due to a connecting tube attached directly to it, is eliminated. A further advantage of the new design is that the hollow elongated profile of the duct link of the parallel guide construction provides a high degree of stability.

To best advantage, the duct is connected to the exhaust cover by means of a fitting which forms a removable attachment to the exhaust cover, but which has a movable and sealed mounting to the duct at one axis of the axis linkage. Together the duct and the fitting form, as it were, a short and a long side of a parallelogram. In this connection, it is particularly intended that the duct as well as the fitting have essentially an elongated rectangular cross-section, whereby the long sides of the rectangles themselves form a seal, while seals attached to the duct in the area of the short sides of the rectangle form seals with the fitting. An oblique cut through the duct's cross-section and the uncomplicated form of the fitting require that only simple precautions for sealing in the area of the short sides of the rectangles of the duct are necessary.

According to a preferred embodiment, the guide bar is also pivotally attached to the fitting, which arrangement increases the precision of the parallel positioning and simplifies mounting. The exhaust cover can, therefore, independent of the guide construction, be attached to or detached from the fitting.

The specific embodiment depicts a protective hood of a circular table saw. Two links of the four-linkage parallel link guide, namely, duct or conduit 2 and guide bar 3 (described in further detail below) are pivotally attached at axes 4 and 5, respectively, to plate 1, which must be stationary. Duct 2, in profile, consists of a rectangular cross-section with wide sides 2a and narrow sides 2b. In the region of narrow side 2b, which is facing guide bar 3, the wide sides 2a form extensions 6, which form a U-shaped guard with the adjacent narrow side 2b (FIG. 2).

At its one end, in the region of plate 1, the rectangular profile of duct 2 is cut vertical to its axis, and is capped with attached endpiece 7, which has a molded connecting tube 8 for the spiral hose of the exhaust. Tube 8 is directly connected to the suction part of an exhaust fan (not shown).

On the other end, the rectangular profile of duct 2 (as clearly seen in FIG. 1) is cut obliquely to form an edge 10 by which the cut edge in one portion of the sides 2a follows the outer contour of plastic seal 9. This outer contour forms nearly a right angle with edge 10. Narrow side 2b, which is adjacent guide bar 3, is shortened by a recessed cut at this end of duct 2 and terminates at 11.

In this end area of duct 2 is fitting 12 (made of a high-impact plastic, such as "Makrolon") which also forms an essentially rectangular cross-section with wide sides 12a and narrow sides 12b. The "inner" narrow side 12b is, however, as FIG. 1 shows, angled, so that a smooth transition to narrow side 2b of duct 2 in the neighborhood of guide bar 3 occurs. In the interior of fitting 12 and parallel to its narrow sides 12b, two separators 13 are angled in a similar manner. These separators improve the passage of the exhaust air and prevent the compacting of the shavings in the area of the elbow. Thickened portion 14 of one separator 13 serves to receive pivot pin 15. The axis 16 of pin 15 forms one of the two points of rotation at this end of the parallelogram of the guide. A plastic or rubber seal 17, which is attached to the adjoining narrow side 2b of duct 2, contacts obtuse angled area 12c of adjacent narrow side 12b of fitting 12 and seals the interior of duct 2 with the interior of fitting 12 in this area. In the area of the other narrow side 2b of duct 2, the angle is so formed that the plastic seal 9 is attached to side 2b (and between the two sides 2a). The curvature of seal 9, seen in FIG. 1, corresponds to an arc of a circle with a center at axis 16, and the short sides 12b of fitting 12 describe the same, i.e., matching, arc in this region. Cross-bars 18 are provided there for reinforcement.

The "front" axis of rotation 19 of guide bar 3 is also positioned on fitting 12, whose narrow side 12b is suitably thickened in this area to receive pivot pin 20. Guide bar 3 is, as illustrated in FIG. 1, curved at its ends, and is partially inserted along the greatest part of its length between the side walls of the U-shaped guard, which is formed from the extensions 6 of duct 2. This guard covers the space between duct 2 and guide bar 3. In this way, injury to the operator's finger, which might otherwise result from unintentionally putting it between the duct and the bar, is prevented at all various height positions of the protective cover when duct 2 and guide bar 3 approach one another during height adjustment. Further, the space requirement of the guide construction is reduced, without reducing the distances between axes 4 and 5 and between axes 16 and 19. These distances are important for precise operation. Specifically, the distance between axes 4 and 5 equals the distance between axes 16 and 19, and the distance between axes 4 and 16 equals the distance between axes 5 and 19, thus forming a parallelogram.

With the thickening (which accommodates pivot pin 20) of narrow side 12b of fitting 12, a corresponding thickening 28 of the other narrow side 12b forms a flange-shaped opening for a fitted flange 21 on the upper end of exhaust hood 22, which flares out toward the bottom in the customary manner. Rollers 23 are mounted on the outer ends of hood 22 to roll in the cutting direction. A locking screw 27 removably secures hood 22 to fitting 12. A power-driven circular saw blade 24 extends from the surface of table top 26 into the interior of hood 22. Rollers 23 rest on work piece 25 which, in turn, is supported by stationary table top 26 of the table saw. Rollers 23 facilitate transport of work piece 25 between hood 22 and table top 26 as work piece 25 is cut by saw blade 24. As depicted in FIG. 1, the height of hood 22 must be adjusted to accommodate the thickness of work piece 25. This is done in a manner that insures that the bottom edge of hood 22 remains parallel to table top 26 during height adjustment by virtue of the four-axis, parallel-linkage vertical guide. The pivot points of this guide are axes 4, 5, 16 and 19. Duct 2 and guide bar 3 comprise two long parallel linkages of the guide extending between axes 4 and 16 and axes 5 and 19, respectively, while plate 1 and fitting 12 comprise two short parallel linkages of the guide extending between axes 4 and 5 and axes 16 and 19, respectively. Since the linkage comprising plate 1 remains stationary, the linkage comprising fitting 12 and, thus, hood 22, remains at the same angular position relative to table top 26 as the linkages comprising duct 2 and guide bar 3 move during height adjustment of hood 22. In this manner, the bottom edge of hood 22 remains parallel to the surface of table top 26, and shavings resulting from the cutting operation are removed from hood 22 through one linkage of the guide, namely, duct 2.

What is claimed is:

1. A work tool machine comprising:
   a power tool;
   an exhaust hood assembly disposed over the power tool in a manner to permit access of a work piece thereto;
   a stationary member spaced from the hood assembly;
   an elongated guide bar extending between the stationary member and the hood assembly;
   means for pivotally attaching one end of the guide bar to the stationary member for rotation about a first axis;
   means for pivotally attaching the other end of the guide bar to the hood assembly for rotation about a second axis;
   an elongated conduit extending between the stationary member and the hood assembly in fluid communication with the hood assembly;
   means for pivotally attaching one end of the conduit to the stationary member for rotation about a third axis;
   means for pivotally attaching the other end of the conduit to the hood for rotation about a fourth axis, the distance between the first and second axes being equal to the distance between the third and fourth axes, and the distance between the first and third axes being equal to the distance between the second and fourth axes; and
   means for exhausting the conduit.

2. The work machine of claim 1, in which the hood assembly comprises a hood having an elongated rectangular open bottom with a pair of narrow sides and a pair of wide sides, a fitting having an elongated rectangular inlet with narrow sides corresponding to the narrow sides of the lower portion of the hood and wide sides that are narrower than the wide sides of the lower portion of the hood, and a flared section having an elongated rectangular cross-section coupling the lower portion of the hood to the inlet of the fitting.

3. The work machine of claim 2, additionally comprising means for removably attaching the fitting to the flared portion of the hood.

4. The work tool of claim 2, in which the conduit has an elongated rectangular cross-section and two narrow sides corresponding in width to the narrow sides of the hood.

5. The work machine of claim 4, in which the other end of the guide bar and the other end of the conduit are both pivotally attached to the fitting.

6. The work machine of claim 5, in which the fitting extends inside the adjacent end of the conduit such that one narrow side of the fitting is farther from the stationary member than the other, the farther narrow side of the fitting having a curvature corresponding to an arc of a circle with a center at the fourth axis, the adjacent end of the conduit having a seal with a matching curvature in contact with the farther narrow side of the fitting along their areas of relative movement.

7. The work machine of claim 6, in which the narrow side of the fitting nearer the stationary member lies between the second and fourth axes and forms an obtuse angle, and the adjacent end of the conduit has a seal engaging the angled narrow side of the fitting.

8. The work machine of claim 7, in which the interior of the fitting has a plurality of separators extending between the wide sides thereof.

9. The work machine of claim 8, in which the separators are angled obtusely.

10. The work machine of claim 4, in which the guide bar is adjacent to one narrow side of the conduit, and the conduit has a U-shaped guard covering the space between the guide bar and the conduit.

11. The work machine of claim 2, in which the guide bar is curved away from the conduit at its ends where the first and second axes are located.

12. The work machine of claim 2, additionally comprising rollers on the hood adjacent to its narrow sides.

* * * * *